United States Patent
Ochiai

(10) Patent No.: US 11,141,776 B2
(45) Date of Patent: Oct. 12, 2021

(54) METHOD OF MANUFACTURING WASHERS

(71) Applicant: Taiho Kogyo Co., Ltd., Toyota (JP)

(72) Inventor: Hirokazu Ochiai, Toyota (JP)

(73) Assignee: TAIHO KOGYO CO., LTD., Toyota (JP)

( * ) Notice: Subject to any disclaimer, the term of this patent is extended or adjusted under 35 U.S.C. 154(b) by 0 days.

(21) Appl. No.: 16/306,945

(22) PCT Filed: Jun. 20, 2017

(86) PCT No.: PCT/JP2017/022700
§ 371 (c)(1),
(2) Date: Dec. 4, 2018

(87) PCT Pub. No.: WO2017/221933
PCT Pub. Date: Dec. 28, 2017

(65) Prior Publication Data
US 2019/0143395 A1    May 16, 2019

(30) Foreign Application Priority Data

Jun. 21, 2016  (JP) .............................. JP2016-123079

(51) Int. Cl.
*B21D 53/20*    (2006.01)
*F16C 33/14*    (2006.01)
(Continued)

(52) U.S. Cl.
CPC ............. *B21D 53/20* (2013.01); *B21D 28/06* (2013.01); *B21D 28/10* (2013.01); *F16B 43/005* (2013.01);
(Continued)

(58) Field of Classification Search
CPC .... F16C 2220/84; F16C 33/046; F16C 33/08; B21D 28/06; B21D 28/08; B21D 53/10;
(Continued)

(56) References Cited

U.S. PATENT DOCUMENTS

RE15,496  E  * 11/1922  Speer ..................... B21D 28/08
                                                83/32
4,210,041  A  *  7/1980  Mitman ................ B21D 28/06
                                                33/11
(Continued)

FOREIGN PATENT DOCUMENTS

CN          1914432 A     2/2007
CN        101035992 A     9/2007
(Continued)

OTHER PUBLICATIONS

Translation of WO2007/143987 (Year: 2007).*
(Continued)

*Primary Examiner* — Andrea L Wellington
*Assistant Examiner* — Samuel A Davies
(74) *Attorney, Agent, or Firm* — Buchanan Ingersoll & Rooney PC

(57) ABSTRACT

There is provided a method of manufacturing washers with improved material yield. The method includes: a preparing step of preparing a material having a panel shape; a first cutting-out step of cutting out a first thrust washer having a substantially arc shape from the material; and a second cutting-out step of cutting out a second thrust washer from a portion of the material in contact with a portion from which the first thrust washer is cut out.

2 Claims, 14 Drawing Sheets

(51) Int. Cl.
  *B21D 28/06* (2006.01)
  *F16C 33/04* (2006.01)
  *F16C 17/04* (2006.01)
  *B21D 28/10* (2006.01)
  *F16B 43/00* (2006.01)
  *F16C 17/10* (2006.01)

(52) U.S. Cl.
  CPC ............ *F16C 17/04* (2013.01); *F16C 17/10* (2013.01); *F16C 33/046* (2013.01); *F16C 33/14* (2013.01); *F16C 2220/84* (2013.01)

(58) Field of Classification Search
  CPC ........ B21D 53/20; B21D 53/22; B21D 28/04; B21D 28/10; F16B 43/005; F16B 43/007; Y10T 29/49645
  See application file for complete search history.

(56) References Cited

U.S. PATENT DOCUMENTS

| | | | | |
|---|---|---|---|---|
| 4,859,828 | A * | 8/1989 | Zumstein | B21D 28/06 219/121.67 |
| 5,071,056 | A * | 12/1991 | Sheets | B21D 28/06 228/170 |
| 5,123,271 | A * | 6/1992 | Sofy | B21D 28/08 72/329 |
| 8,449,193 | B2 * | 5/2013 | Kuwabara | F16C 43/02 384/420 |
| 8,579,509 | B2 * | 11/2013 | Ishigo | F16C 33/1065 384/288 |
| 2005/0185867 | A1 | 8/2005 | Chu et al. | |
| 2006/0034556 | A1 | 2/2006 | Thompson et al. | |
| 2010/0215300 | A1 * | 8/2010 | Schlabs | F16C 17/10 384/420 |
| 2013/0293060 | A1 * | 11/2013 | Hasuo | B21D 28/06 310/254.1 |
| 2015/0135518 | A1 * | 5/2015 | Mariajoseph | H02K 15/024 29/596 |
| 2015/0323006 | A1 * | 11/2015 | George | F16C 33/208 384/291 |

FOREIGN PATENT DOCUMENTS

| | | |
|---|---|---|
| CN | 201982486 U | 9/2011 |
| CN | 204553525 U | 8/2015 |
| DE | 2433929 A1 | 2/1976 |
| DE | 10 2006 027 500 A1 | 12/2007 |
| DE | 102008009856 B4 | 7/2013 |
| GB | 1095664 A | 12/1967 |
| JP | 54-098947 | 7/1979 |
| JP | 57064423 A | 4/1982 |
| JP | 1-104425 | 7/1989 |
| JP | 07164069 A | 6/1995 |
| JP | 2007523305 A | 8/2007 |
| JP | 2008510107 A | 4/2008 |
| JP | 2010023193 A | 2/2010 |
| WO | 2007143987 A1 | 12/2007 |

OTHER PUBLICATIONS

International Search Report (PCT/ISA/210) dated Sep. 5, 2017, by the Japanese Patent Office as the International Searching Authority for International Application No. PCT/JP2017/022700.

Office Action dated Sep. 4, 2019, by the Chinese Patent Office in corresponding Chinese Patent Application No. 201780035980.0. (7 pages).

Extended European Search Report dated Oct. 21, 2019, by the European Patent Office in corresponding European Application No. 17815401.9. (7 pages).

Notice of Reasons for Refusal issued in corresponding Japanese Patent Application No. 2016-123079, dated Feb. 25, 2020, with English Translation (19 pages).

* cited by examiner

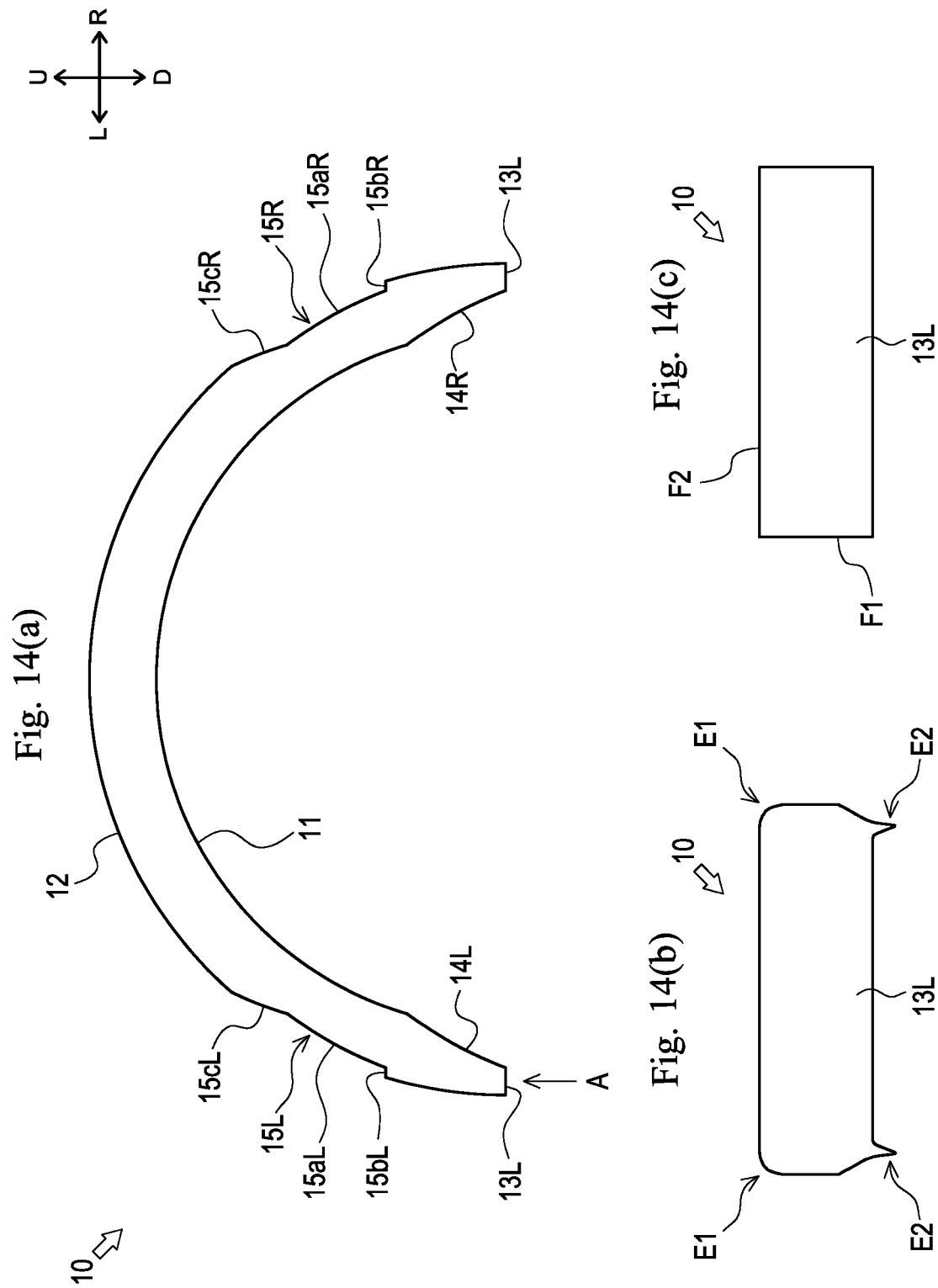

METHOD OF MANUFACTURING WASHERS

TECHNICAL FIELD

The present invention relates to a technique of a washer formed in an arc shape.

BACKGROUND ART

Conventionally, there has been a known technique of a washer formed in an arc shape. For example, such a technique is described in Patent Literature 1.

Patent Literature 1 discloses the technique of combining two washers (washer members) having an arc (semicircular) shape and mounting the washers to a cylinder block.

Such a washer having an arc shape can be manufactured by stamping (pressing) a material having a panel shape by use of a predetermined die.

FIG. 12 shows a manner of manufacturing a plurality of washers (thrust washers 90) having an arc shape by stamping one material 1 having a panel shape by use of a die. As shown in FIG. 12, it is possible to manufacture the plurality of thrust washers 90 by punching the material 1 several times while moving the material 1 in a constant direction with respect to the die. However, because there are clearances between the adjacent thrust washers 90 as shown in FIG. 12, the material at the portions (clearances) is wasted to result in low material yield and there is room for improvement in this regard.

CITATION LIST

Patent Literature

Patent Literature 1: Japanese Patent Application Laid-open No. 2010-23193

SUMMARY OF INVENTION

Technical Problem

The present invention has been made with the above-described circumstances in view and an object of the present invention is to provide a method of manufacturing washers with improved material yield.

Solution to Problem

The problem to be solved by the present invention is as described above and a solution to the problem will be described next.

A method of manufacturing washers according to the present invention includes: a preparing step of preparing a material having a panel shape; a first cutting-out step of cutting out a first washer having a substantially arc shape from the material; and a second cutting-out step of cutting out a second washer from a portion of the material in contact with a portion from which the first washer is cut out.

The second washer is cut out such that an outer peripheral cut-away portion formed on an outer peripheral face of the second washer is in contact with an end portion of an inner peripheral face of the first washer in the second cutting-out step.

The second washer is cut out from a second area partially overlapping with a first area, from which the first washer is cut out, in the second cutting-out step.

Advantageous Effects of Invention

As effects of the present invention, the present invention exerts the following effects.

In the method of manufacturing the washers according to the present invention, it is possible to improve material yield. Moreover, it is possible to suppress occurrence of droop.

In the method of manufacturing the washers according to the present invention, it is possible to easily manufacture the washers.

BRIEF DESCRIPTION OF DRAWINGS

FIG. 14(a) is a front view showing the thrust washer. FIG. 14(b) is a view showing an end face of a thrust washer obtained by stamping a material (an enlarged view in a direction of arrow A). FIG. 14(c) is a view of an end face of the thrust washer obtained by cutting a material (an enlarged view in a direction of arrow A).

DESCRIPTION OF EMBODIMENTS

Figure 1:
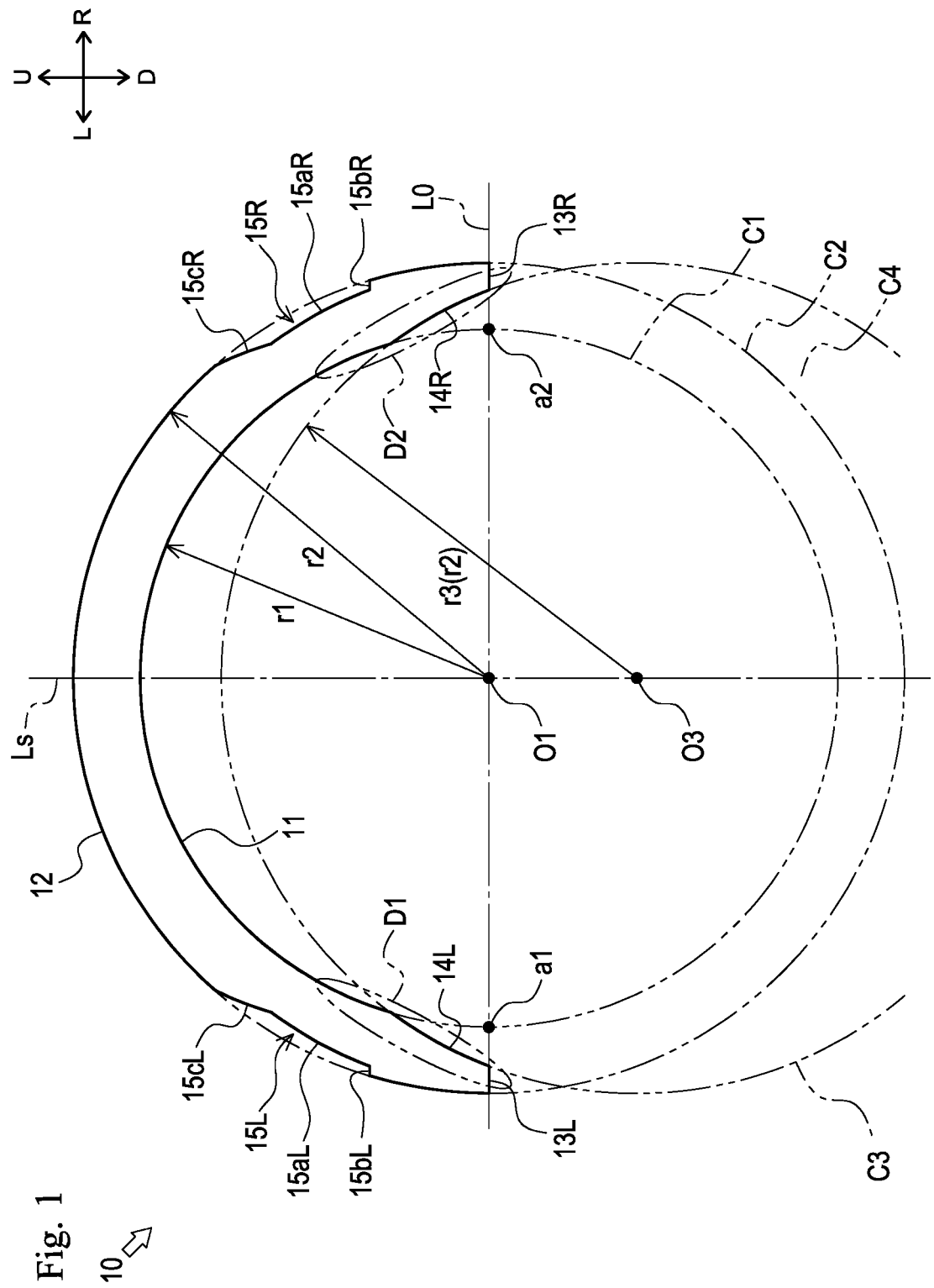
FIG. 1 is a front view showing a configuration of a thrust washer according to a first embodiment.

In the following description, directions shown by arrows U, D, L, and R in the figures are respectively defined as upward, downward, leftward, and rightward directions. A direction perpendicular to a paper sheet is defined as a front-rear direction in the description.

A thrust washer 10 according to a first embodiment will be described below with reference to FIG. 1.

The thrust washer 10 is provided to a shaft member (e.g., a crankshaft of an engine) and receives a load applied to the shaft member in a thrust direction. The thrust washer 10 is formed by stamping a material 1 having a panel shape (described later) into a substantially semicircular shape. As a result, the thrust washer 10 is formed in a panel shape having a substantially constant thickness in the front-rear direction. A shape of the thrust washer 10 in a front view will be described below. The thrust washer 10 mainly includes an inner peripheral face 11, an outer peripheral face 12, a left end face 13L, a right end face 13R, a left inner peripheral cut-away portion 14L, a right inner peripheral cut-away portion 14R, a left outer peripheral cut-away portion 15L, and a right outer peripheral cut-away portion 15R.

The inner peripheral face 11 is a face formed on a radially inner side of the thrust washer 10. The inner peripheral face 11 is formed along circumference C1 of an arc centered at a predetermined point (arc center O1) and having radius r1. The inner peripheral face 11 is formed into an arc shape (substantially semicircular shape) extending above arc center O1 from a left side to a right side.

The outer peripheral face 12 is a face formed on a radially outer side of the thrust washer 10. The outer peripheral face 12 is formed along circumference C2 of an arc centered at arc center O1 and having radius r2. The outer peripheral face 12 is formed into an arc shape (substantially semicircular shape) extending above arc center O1 from a left side to a right side. Radius r2 is set to be longer than radius r1. In this manner, the outer peripheral face 12 is formed in the arc shape concentric with the inner peripheral face 11.

The left end face 13L is a face connecting a left end portion of the inner peripheral face 11 and a left end portion of the outer peripheral face 12. The left end face 13L is formed on a straight line (first imaginary straight line L0) extending in a left-right direction through arc center O1. One end portion (inner peripheral end portion) of the left end face 13L is connected to the left end portion of the inner peripheral face 11 through the left inner peripheral cut-away portion 14L (described later). The other end portion (outer peripheral end portion) of the left end face 13L is connected to the left end portion of the outer peripheral face 12.

The right end face 13R is a face connecting a right end portion of the inner peripheral face 11 and a right end portion of the outer peripheral face 12. The right end face 13R is formed such that the left end face 13L and the right end face 13R are symmetrical with respect to a straight line (symmetry axis Ls) extending in a vertical direction through arc center O1 (perpendicular to first imaginary straight line L0). In other words, the right end face 13R is formed on first imaginary straight line L0.

By forming the left end face 13L and the right end face 13R on first imaginary straight line L0 passing through arc center O1 (i.e., diameter of circumferences C1 and C2) in this manner, the thrust washer 10 is formed in the semicircular shape (shape of an arc having a central angle of 180°).

The left inner peripheral cut-away portion 14L is a face formed by cutting away an inner peripheral side of a left end portion of the thrust washer 10 (the left end portion of the inner peripheral face 11). The left inner peripheral cut-away portion 14L is formed in a shape of a curved line extending from the left end face 13L toward an upper right side. More specifically, the left inner peripheral cut-away portion 14L is formed along circumference C3 of an arc centered at arc center O3 set on symmetry axis Ls and below arc center O1 and having radius r3. Here, radius r3 of circumference C3 is set to be equal to radius r2 of circumference C2. In this way, the left inner peripheral cut-away portion 14L is formed to extend from the inner peripheral face 11 to the left end face 13L. In this manner, the left inner peripheral cut-away portion 14L is formed by cutting away a portion of the thrust washer 10, formed in the semicircular shape, including point of intersection a1 of a left end portion of circumference C1 and first imaginary straight line L0.

The right inner peripheral cut-away portion 14R is a face formed by cutting away an inner peripheral side of a right end portion of the thrust washer 10 (the right end portion of the inner peripheral face 11). The right inner peripheral cut-away portion 14R is formed in a shape of a curved line extending from the right end face 13R toward an upper left side. More specifically, the right inner peripheral cut-away portion 14R is formed along circumference C3. In this way, the right inner peripheral cut-away portion 14R is formed such that the left inner peripheral cut-away portion 14L and the right inner peripheral cut-away portion 14R are symmetrical with respect to symmetry axis Ls. In other words, the right inner peripheral cut-away portion 14R is formed by cutting away a portion of the thrust washer 10, formed in the semicircular shape, including point of intersection a2 of a right end portion of circumference C1 and first imaginary straight line L0.

The left outer peripheral cut-away portion 15L is a face formed by cutting away a portion (close to the left end portion) of the outer peripheral face 12. The left outer peripheral cut-away portion 15L is formed at a position corresponding to the left inner peripheral cut-away portion 14L, that is, the position above the left inner peripheral cut-away portion 14L.

The left outer peripheral cut-away portion 15L mainly includes a left arc-shaped face 15aL, a left first side face 15bL, and a left second side face 15cL.

The left arc-shaped face 15aL is a face forming a bottom portion of the left outer peripheral cut-away portion 15L. The left arc-shaped face 15aL is formed in a shape of a curved line extending from a lower left side toward the upper right side.

The left first side face 15bL is a face forming one end portion (left end portion) of the left outer peripheral cut-away portion 15L. The left first side face 15bL is formed in a shape of a straight line extending from a left end portion of the left arc-shaped face 15aL toward a left side.

The left second side face 15cL is a face forming the other end portion (right end portion) of the left outer peripheral cut-away portion 15L. The left second side face 15cL is formed in a shape of a curved line extending from a right end portion of the left arc-shaped face 15aL toward the upper right side.

Here, the left outer peripheral cut-away portion 15L is formed in the same shape as an outside shape of a portion close to the left end portion of the inner peripheral face 11 (a first end portion D1 in FIG. 1). Specifically, the left arc-shaped face 15aL is formed in the same shape as the left inner peripheral cut-away portion 14L. The left first side face 15bL is formed in the same shape as the left end face 13L (more specifically, a portion close to a right end portion of the left end face 13L). The left second side face 15cL is formed in the same shape as the inner peripheral face 11 (more specifically, a portion close to the left end portion of the inner peripheral face 11).

The right outer peripheral cut-away portion 15R is formed by cutting away a portion (close to the right end portion) of the outer peripheral face 12. The right outer peripheral cut-away portion 15R is formed at a position corresponding to the right inner peripheral cut-away portion 14R, that is, the position above the right inner peripheral cut-away portion 14R.

The right outer peripheral cut-away portion 15R is formed such that the left outer peripheral cut-away portion 15L and the right outer peripheral cut-away portion 15R are symmetrical with respect to symmetry axis Ls. Specifically, the right outer peripheral cut-away portion 15R mainly includes a right arc-shaped face 15aR, a right first side face 15bR, and a right second side face 15cR.

The right arc-shaped face 15aR is a face forming a bottom portion of the right outer peripheral cut-away portion 15R. The right arc-shaped face 15aR is formed in a shape of a curved line extending from a lower right side toward the upper left side.

The right first side face 15bR is a face forming one end portion (right end portion) of the right outer peripheral cut-away portion 15R. The right first side face 15bR is formed in a shape of a straight line extending from a right end portion of the right arc-shaped face 15aR toward a right side.

The right second side face 15cR is a face forming the other end portion (left end portion) of the right outer peripheral cut-away portion 15R. The right second side face 15cR is formed in a shape of a curved line extending from a left end portion of the right arc-shaped face 15aR toward the upper left side.

Here, the right outer peripheral cut-away portion 15R is formed in the same shape as an outside shape of a portion close to the right end portion of the inner peripheral face 11 (a second end portion D2 in FIG. 1). Specifically, the right arc-shaped face 15aR is formed in the same shape as the right inner peripheral cut-away portion 14R. The right first side face 15bR is formed in the same shape as the right end face 13R (more specifically, a portion close to a left end portion of the right end face 13R). The right second side face 15cR is formed in the same shape as the inner peripheral face 11 (more specifically, a portion close to the right end portion of the inner peripheral face 11).

Moreover, a relative positional relationship between the left outer peripheral cut-away portion 15L and the right outer peripheral cut-away portion 15R is the same as a relative positional relationship between the first end portion D1 and the second end portion D2.

In this manner, the thrust washer 10 is formed in the shape obtained by appropriately cutting portions away from the inner peripheral face and the outer peripheral face of the substantially semicircular panel member. The two thrust washers 10 are combined and disposed in an annular shape and mounted to appropriate positions (e.g., a housing for supporting a shaft member).

With reference to FIGS. 2 to 5, the method of manufacturing the thrust washers 10 formed as described above will be described below.

Figure 2:
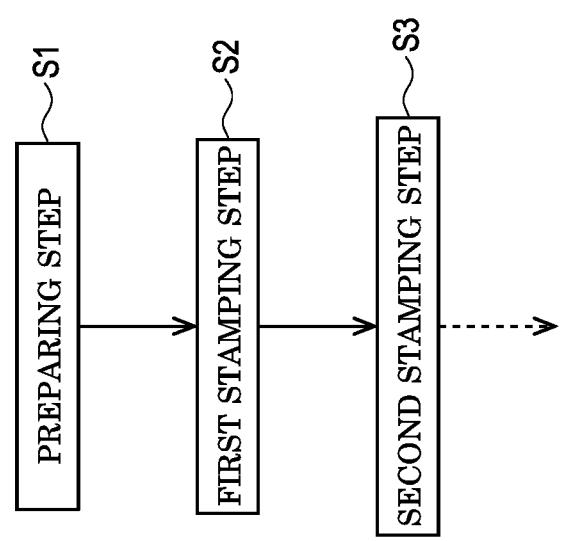
FIG. 2 is a flowchart showing a method of manufacturing the thrust washers.

As shown in FIG. 2, the method of manufacturing the thrust washers 10 mainly includes a preparing step S1, a first stamping step S2, and a second stamping step S3.

Figure 3B:
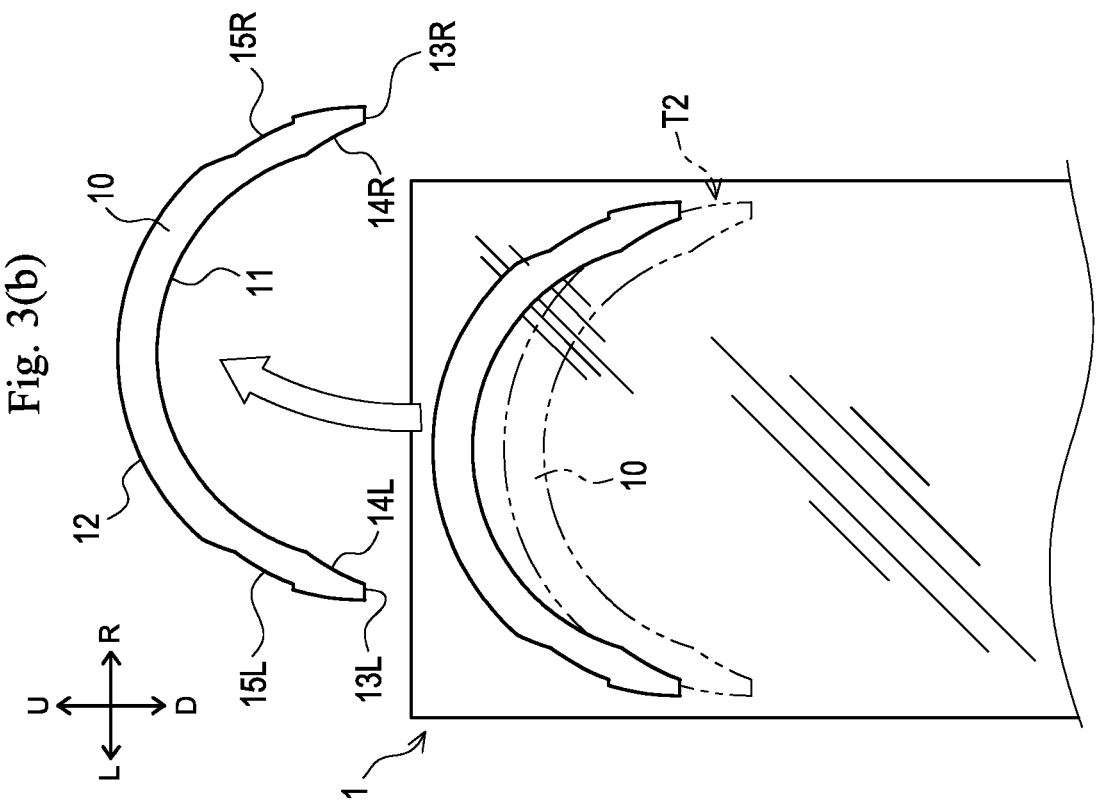
FIG. 3(b) is a front view of a manner in which the thrust washer is obtained by stamping in a first stamping step.
Figure 3A:
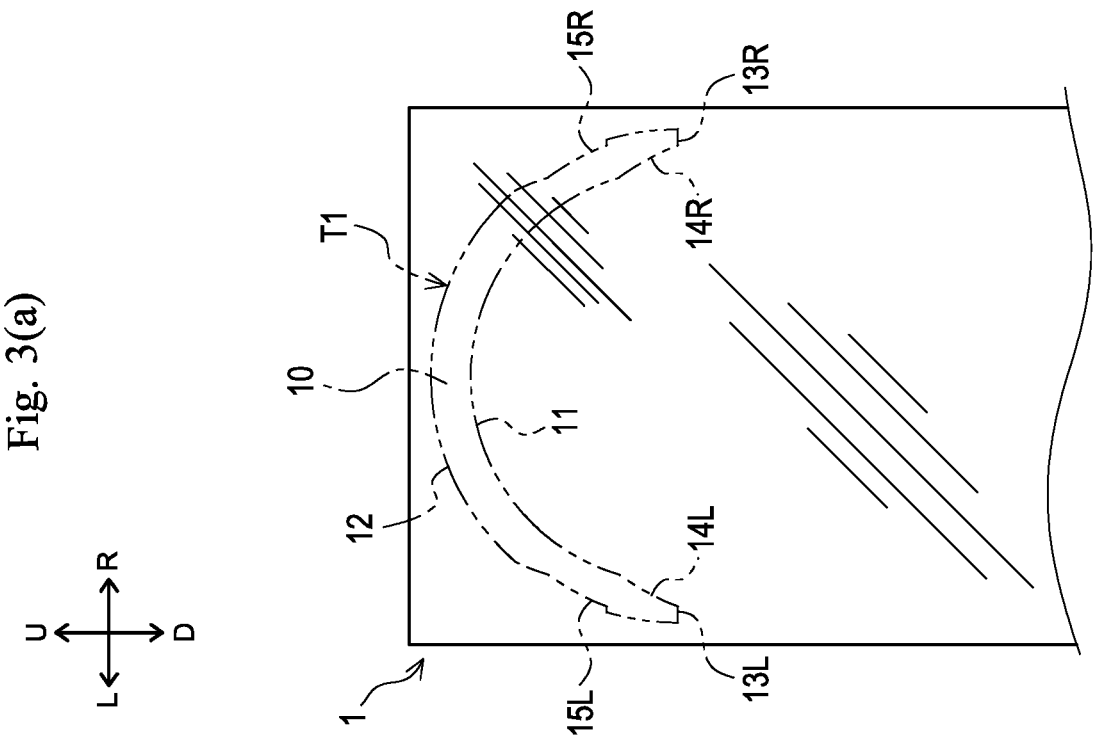
FIG. 3(a) is a front view showing a material prepared in a preparing step.

The preparing step S1 is a step of preparing the material 1. As shown in FIG. 3(a), the material 1 is a rectangular panel-shaped member. The material 1 is formed by an appropriate material (e.g., a steel sheet made of a single kind of material and bimetal made of a plurality of kinds of material). The material 1 is disposed with its longitudinal direction oriented in the vertical direction.

After the preparing step S1, the first stamping step S2 is performed.

The first stamping step S2 is a step of stamping the material 1 prepared in the preparing step S1 into the thrust washer 10. In the first stamping step S2, a first area T1 (see FIG. 3(a)) of the material 1 corresponding to the shape of the thrust washer 10 is stamped by using a predetermined die formed in the shape of the thrust washer 10. In this way, it is possible to obtain the thrust washer 10 from the material 1 (see FIG. 3(b)). At this time, the first area T1 is set such that the symmetry axis Ls of the thrust washer 10 in the first area T1 extends along the longitudinal direction (vertical direction) of the material 1 (see FIG. 4).

After the first stamping step S2, the second stamping step S3 is performed.

The second stamping step S3 is a step of further stamping the material 1, from which the thrust washer 10 has been obtained by stamping in the first stamping step S2, into a thrust washer 10 having the same shape. In the second stamping step S3, a second area T2 (see FIG. 3(b)) of the material 1 corresponding to the shape of the thrust washer 10 is stamped by using the same die used in the first stamping step S2.

Figure 4:
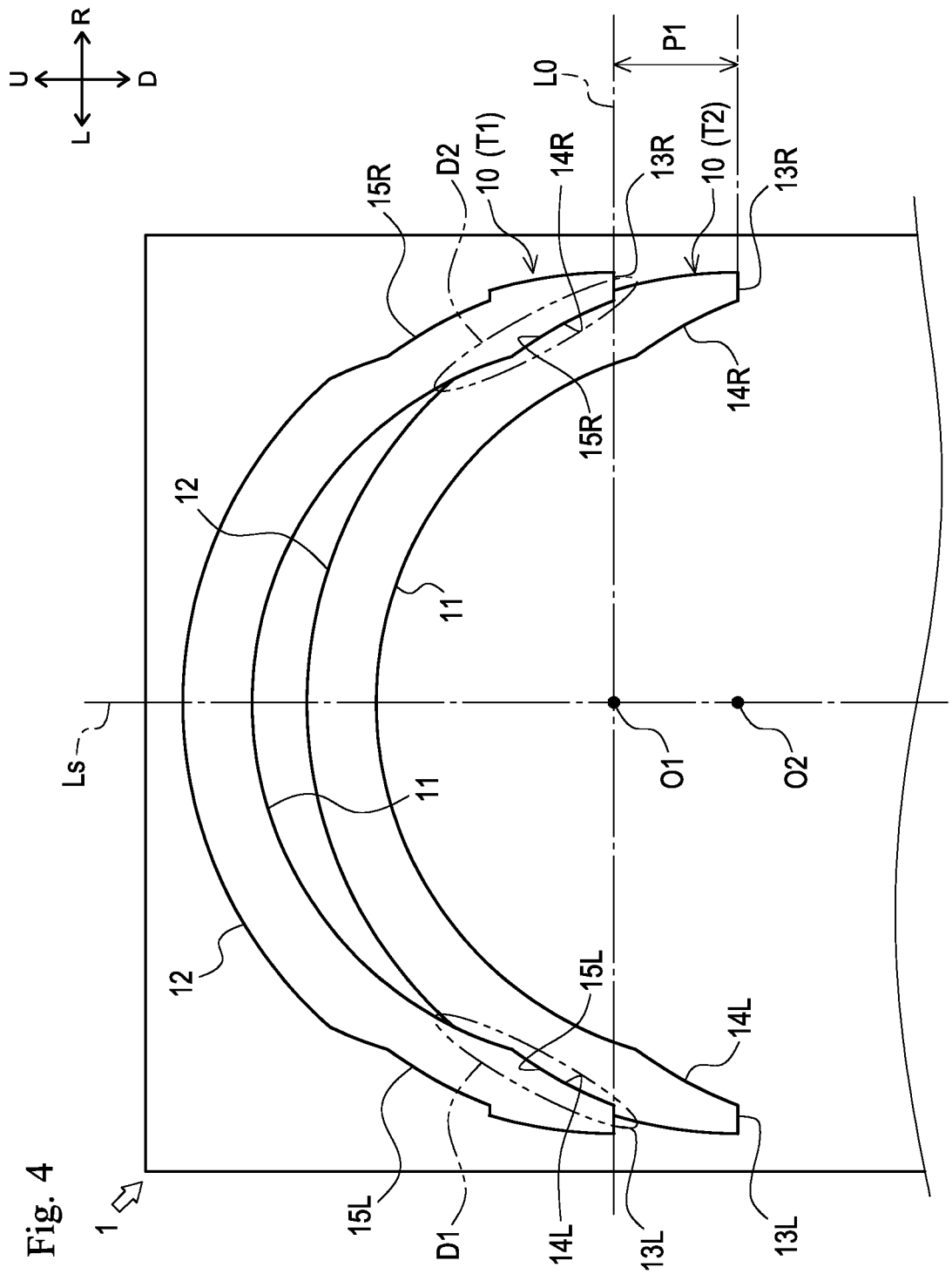
FIG. 4 is a front view showing a first area and a second area according to the first embodiment.
Figure 5:
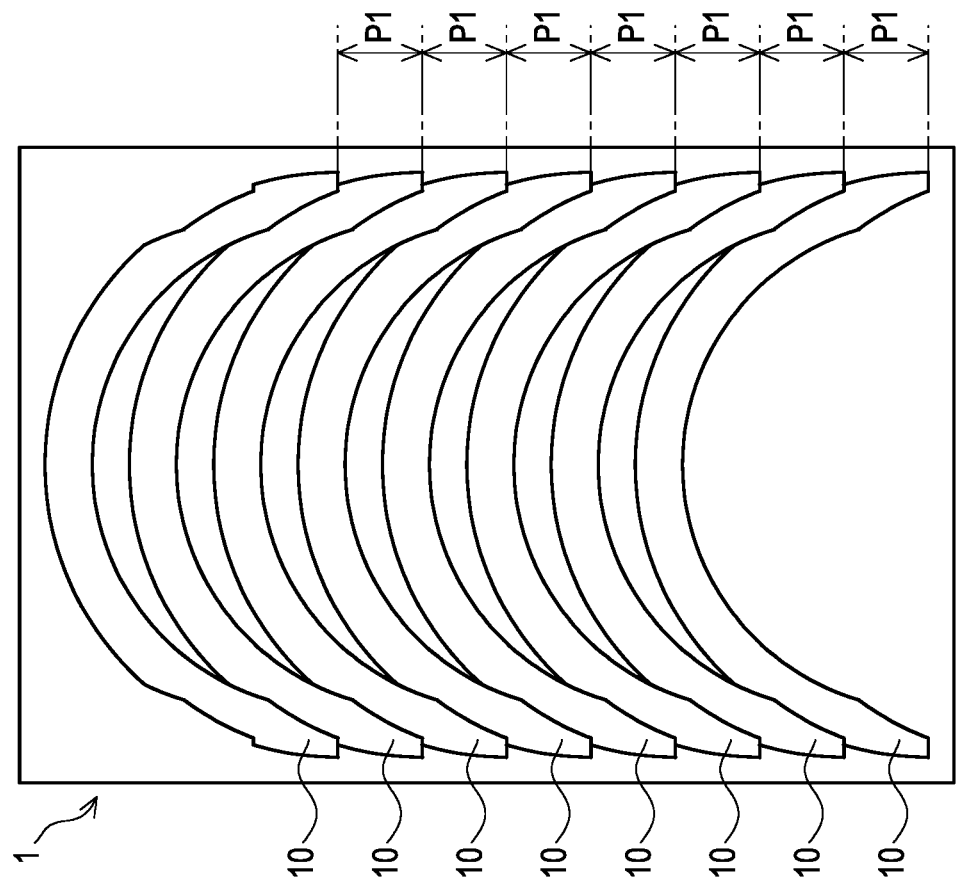
FIG. 5 is a schematic view showing a pitch of the thrust washers.
Figure 5:
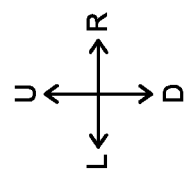

Here, with reference to FIG. 4, a positional relationship between the first area T1 and the second area T2 will be described. As shown in FIG. 4, the second area T2 is set at a position displaced in a predetermined direction from the first area T1. Specifically, the second area T2 is set at the position displaced from the first area T1 by a predetermined pitch P1 in a downward direction (direction in which the left end face 13L and the right end face 13R face) along the symmetry axis Ls of the thrust washer 10 in the first area T1. The pitch P1 is set to such a value that the first area T1 and the second area T2 are in contact with each other. Specifically, the pitch P1 is set such that the left outer peripheral cut-away portion 15L and the right outer peripheral cut-away portion 15R of the thrust washer 10 in the second area T2 are in contact with the first end portion D1 and the second end portion D2 of the thrust washer 10 in the first area T1. Arc center O1 (shown as arc center O2 for convenience in FIG. 4) of an inner peripheral face 11 or the like of the second area T2 set in this manner is positioned on the symmetry axis Ls of the thrust washer 10 in the first area T1.

By setting the second area T2 in this manner, it is possible to set the small pitch P1 while avoiding overlap (interference) between the thrust washer 10 in the first area T1 and the thrust washer 10 in the second area T2. By setting the small pitch P1, it is possible to reduce a clearance between the first area T1 and the second area T2 to increase the number of thrust washers 10 which can be obtained from the material 1 to thereby improve material yield. As a result, it is possible to achieve increase in productivity and reduction in cost.

After the second stamping step S3, a step (not shown) of further obtaining a thrust washer 10 by stamping the material 1 as in the second stamping step S3 is repeated arbitrary times. In this way, it is possible to obtain a plurality of thrust washers 10 from the material 1 (see FIG. 5).

As described above, the thrust washer 10 according to the first embodiment includes: the inner peripheral face 11 formed in the arc shape; the outer peripheral face 12 formed in the arc shape concentric with the inner peripheral face 11 on the radially outer side of the inner peripheral face 11; and the outer peripheral cut-away portions (the left outer peripheral cut-away portion 15L and the right outer peripheral cut-away portion 15R) formed at positions of the outer peripheral face 12 corresponding to the end portions (the first end portion D1 and the second end portion D2) of the inner peripheral face 11 to have the same shapes as the outside shapes of the corresponding end portions of the inner peripheral face 11.

With this configuration, it is possible to improve the material yield. In other words, by bringing the end portions of the inner peripheral face 11 of one of the two adjacent thrust washers 10 and the outer peripheral cut-away portions of the other in contact with each other when the thrust washers 10 are obtained by stamping the material 1, it is possible to set the small pitch between the thrust washers 10.

The thrust washer 10 further includes the inner peripheral cut-away portions (the left inner peripheral cut-away portion 14L and the right inner peripheral cut-away portion 14R) formed at the end portions of the inner peripheral face 11.

With this configuration, it is possible to effectively improve the material yield. In other words, it is possible to set the smaller pitch between the two adjacent thrust washers 10. Moreover, it is possible to reduce depths of the outer peripheral cut-away portions corresponding to the inner peripheral cut-away portions (depths of the cut-away portions from the outer peripheral face 12) to thereby prevent reduction in strength.

Each of the inner peripheral cut-away portions is formed in the arc shape having the same radius r2 as the arc radius of the outer peripheral face 12.

With this configuration, it is possible to effectively improve the material yield. In other words, it is possible to set the smaller pitch between the two adjacent thrust washers 10. Moreover, by forming the outer peripheral cut-away portions corresponding to the inner peripheral cut-away portions in the same arc shapes as the outer peripheral face 12, it is possible to prevent reduction in strength.

The method of manufacturing the thrust washers 10 according to the first embodiment includes: the preparing step S1 of preparing the material 1 having a panel shape; the first stamping step S2 of stamping the material 1 to thereby obtain the first thrust washer 10 having a substantially arc shape; and the second stamping step S3 of stamping the material 1 to thereby obtain the second thrust washer 10 from the portion in contact with the portion from which the first thrust washer 10 is obtained by stamping.

With this configuration, it is possible to improve the material yield. In other words, it is possible to set the small pitch between the two thrust washers by obtaining the second thrust washer 10 from the portion in contact with the first thrust washer 10.

In the method of manufacturing the thrust washers 10 according to the first embodiment, the second thrust washer 10 is obtained by stamping such that the outer peripheral cut-away portions formed on the outer peripheral face of the second thrust washer 10 are in contact with the end portions of the inner peripheral face 11 of the first thrust washer 10 in the second stamping step S3.

With this configuration, it is possible to effectively improve the material yield. In other words, it is possible to set the smaller pitch between the first thrust washer 10 and the second thrust washer 10 by forming the outer peripheral cut-away portions on the second thrust washer 10.

Figure 6:
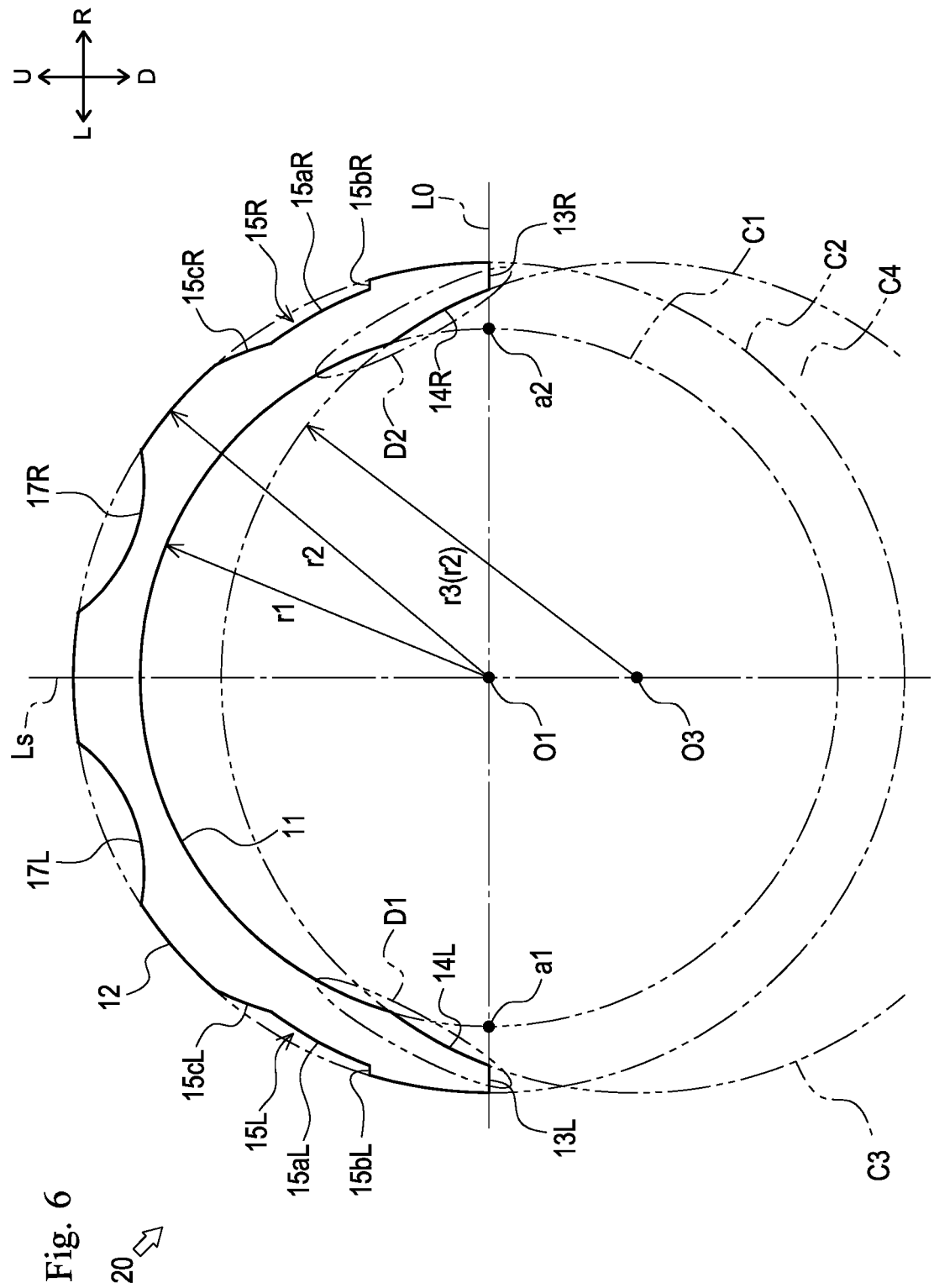
FIG. 6 is a front view showing a configuration of a thrust washer according to a second embodiment.

A thrust washer 20 according to a second embodiment will be described below with reference to FIG. 6.

The thrust washer 20 is different from the thrust washer 10 according to the first embodiment mainly in that the thrust washer 20 further includes a left additional cut-away portion 17L and a right additional cut-away portion 17R. Therefore, other configurations similar to those of the thrust washer 10 according to the first embodiment will be provided with the same reference signs and description of the configurations will be omitted as appropriate.

The left additional cut-away portion 17L is a face formed by cutting away a portion (slightly displaced leftward from a central portion in a left-right direction) of an outer peripheral face 12. The left additional cut-away portion 17L is formed at a position spaced apart by a predetermined distance in a rightward direction from a left outer peripheral cut-away portion 15L. The left additional cut-away portion 17L is formed in an arc shape recessed toward arc center O1.

The right additional cut-away portion 17R is a face formed by cutting away a portion (slightly displaced rightward from the central portion in the left-right direction) of the outer peripheral face 12. The right additional cut-away portion 17R is formed such that the left additional cut-away portion 17L and the right additional cut-away portion 17R are symmetrical with respect to symmetry axis Ls.

In this manner, the plurality of cut-away portions (the left outer peripheral cut-away portion 15L, the left additional cut-away portion 17L, the right additional cut-away portion 17R, and a right outer peripheral cut-away portion 15R) are formed on the outer peripheral face 12 of the thrust washer 20. The plurality of cut-away portions are disposed at substantially equal intervals on the outer peripheral face 12. By forming the left additional cut-away portion 17L and the right additional cut-away portion 17R on the thrust washer 20 in this manner, it is possible to reduce the thrust washer 20 in weight.

Figure 7:
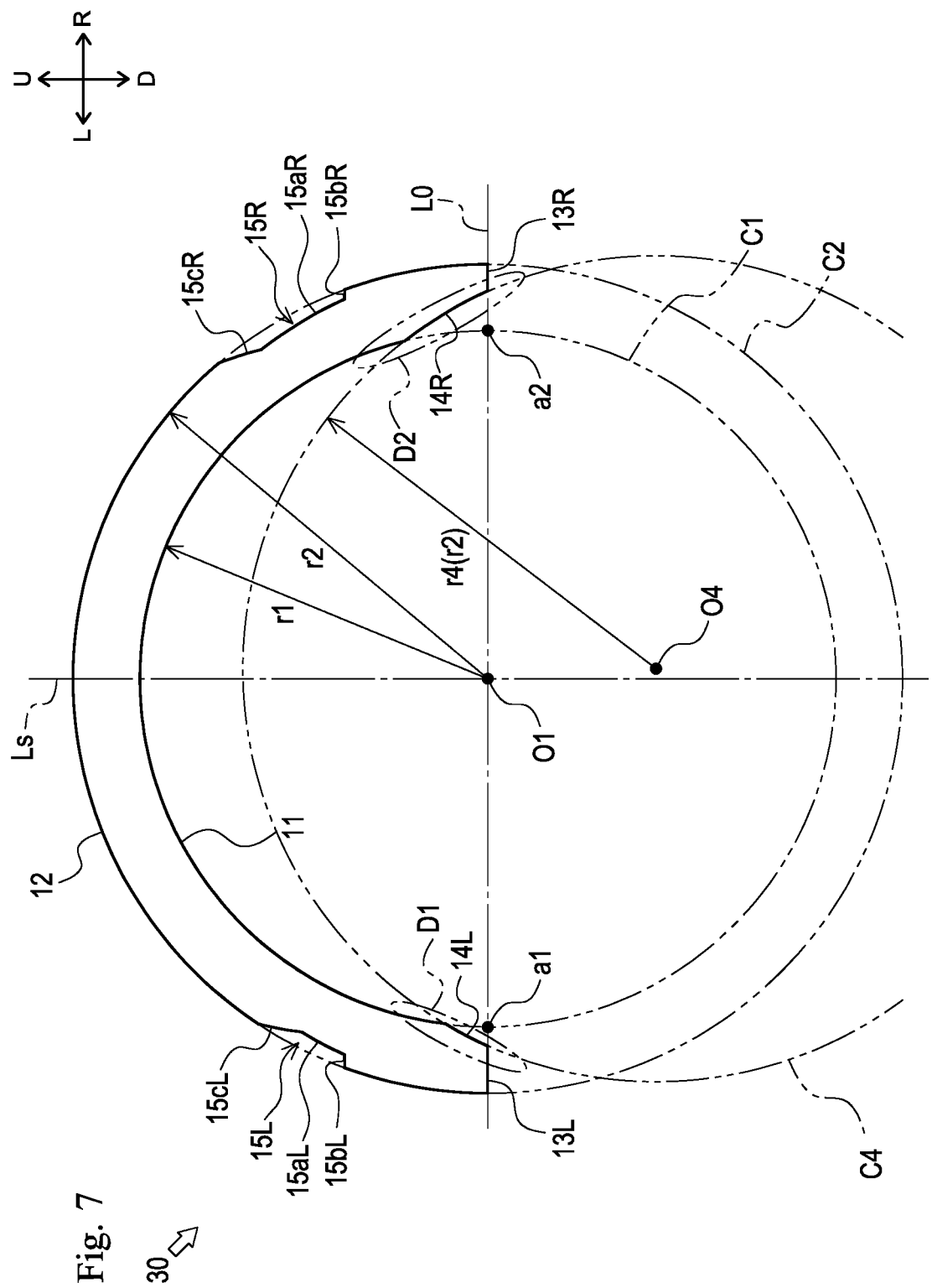
FIG. 7 is a front view showing a configuration of a thrust washer according to a third embodiment.

A thrust washer 30 according to a third embodiment will be described below with reference to FIG. 7.

The thrust washer 30 is different from the thrust washer 10 according to the first embodiment mainly in shapes of a left inner peripheral cut-away portion 14L, a right inner peripheral cut-away portion 14R, a left outer peripheral cut-away portion 15L, and a right outer peripheral cut-away portion 15R. Therefore, other configurations similar to those of the thrust washer 10 according to the first embodiment will be provided with the same reference signs and description of the configurations will be omitted as appropriate.

The left inner peripheral cut-away portion 14L is formed in a shape of a curved line extending from the left end face 13L toward an upper right side. More specifically, the left inner peripheral cut-away portion 14L is formed along circumference C4 of an arc centered at arc center O4 set below arc center O1 and slightly to the right of symmetry axis Ls and having radius r4. Here, radius r4 of circumference C4 is set to be equal to radius r2 of circumference C2.

The right inner peripheral cut-away portion 14R is formed in a shape of a curved line extending from the right end face 13R toward an upper left side. More specifically, the right inner peripheral cut-away portion 14R is formed along circumference C4. Because arc center O4 of circumference C4 is positioned to the right of symmetry axis Ls, the right inner peripheral cut-away portion 14R is formed to be larger than the left inner peripheral cut-away portion 14L (to be larger in vertical dimension and left-right dimension). In other words, the right inner peripheral cut-away portion 14R is formed such that the left inner peripheral cut-away portion 14L and the right inner peripheral cut-away portion 14R are asymmetrical.

The left outer peripheral cut-away portion 15L is formed at a position corresponding to the left inner peripheral cut-away portion 14L, that is, the position above the left inner peripheral cut-away portion 14L. The left outer peripheral cut-away portion 15L is formed in the same shape as an outside shape of a portion close to a left end portion of the inner peripheral face 11 (a first end portion D1 in FIG. 7).

The right outer peripheral cut-away portion 15R is formed at a position corresponding to the right inner peripheral cut-away portion 14R, that is, the position above the right inner peripheral cut-away portion 14R. The right outer peripheral cut-away portion 15R is formed in the same shape as an outside shape of a portion close to a right end portion of the inner peripheral face 11 (a second end portion D2 in FIG. 7). In other words, the right outer peripheral cut-away portion 15R is formed such that the left outer peripheral cut-away portion 15L and the right outer peripheral cut-away portion 15R are asymmetrical.

Corresponding to the left inner peripheral cut-away portion 14L (first end portion D1) which is formed to be relatively small in this manner, the left outer peripheral cut-away portion 15L is also formed to be relatively small. On the other hand, corresponding to the right inner peripheral cut-away portion 14R (second end portion D2) which is formed to be relatively large, the right outer peripheral cut-away portion 15R is also formed to be relatively large. In this manner, the thrust washer 30 can be formed in a bilaterally asymmetrical shape according to a purpose of use, a shape of a place where the thrust washer 30 is to be disposed, and the like.

Figure 8:
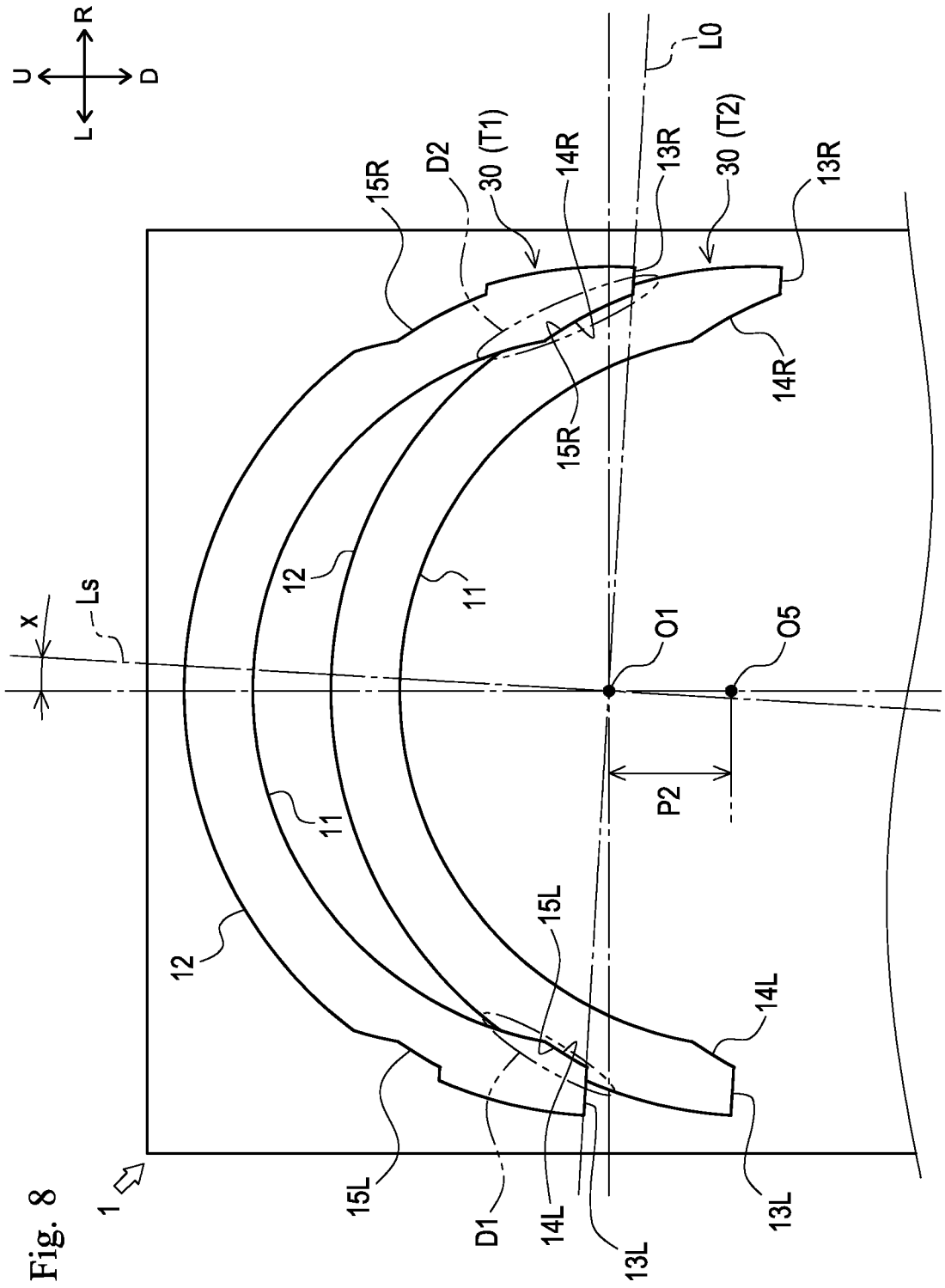
FIG. 8 is a front view showing a first area and a second area according to the third embodiment.

With reference to FIG. 8, a method of manufacturing the thrust washers 30 formed as described above will be described below.

The method of manufacturing the thrust washers 30 is different from the method of manufacturing the thrust washers 10 according to the first embodiment mainly in ways of setting positions of a first area T1 in which a material 1 is stamped in a first stamping step S2 and a second area T2 in which the material 1 is stamped in a second stamping step S3. The positions of the first area T1 and the second area T2 will be described below.

The first area T1 is set such that the symmetry axis Ls of the thrust washer 30 in the first area T1 inclines at angle x in a rightward direction with respect to a longitudinal direction (vertical direction) of the material 1. In this way, the thrust washer 30 in the first area T1 is in an orientation inclining rightward.

The second area T2 is set at a position displaced downward by a predetermined pitch P2 in the longitudinal direction (vertical direction) of the material 1 from the first area T1. In this way, the symmetry axis Ls of the thrust washer 30 in the second area T2 also inclines at angle x in the rightward direction with respect to the longitudinal direction of the material 1. The pitch P2 is set to such a value that the first area T1 and the second area T2 are in contact with each other. Specifically, the pitch P2 is set such that the left outer peripheral cut-away portion 15L and the right outer peripheral cut-away portion 15R of the thrust washer 30 in the second area T2 are in contact with the first end portion D1 and the second end portion D2 of the thrust washer 30 in the first area T1. Arc center O1 (shown as arc center O5 for convenience in FIG. 10) of an inner peripheral face 11 or the like of the second area T2 set in this manner is positioned directly below arc center O1 of the thrust washer 30 in the first area T1.

In manufacturing the thrust washers 30 formed bilaterally asymmetrically in this manner, the thrust washers 30 are similarly disposed such that the left outer peripheral cut-away portion 15L and the right outer peripheral cut-away portion 15R of the thrust washer 30 in the second area T2 are in contact with the first end portion D1 and the second end portion D2 of the thrust washer 30 in the first area T1. In this way, it is possible to set the small pitch P2.

At this time, by appropriately inclining the thrust washers 30 in the first area T1 and the second area T2 (inclining at angle x in the rightward direction in the present embodiment), the arc centers (arc center O1 and arc center O5) of the respective thrust washers 30 are arranged along the longitudinal direction (vertical direction) of the material 1. In this way, even if the thrust washers 30 are bilaterally asymmetrical, the plurality of thrust washers 30 can be manufactured at the small pitch P2 by appropriately stamping the material 1 while the material 1 is moved along the longitudinal direction similarly to the bilaterally symmetrical thrust washers 10 and the like.

Although symmetry axes Ls of the thrust washers 30 in the first area T1 and the second area T2 incline in the rightward direction with respect to the longitudinal direction of the material 1 in the example shown in FIG. 8, the present invention is not limited to this. Symmetry axes Ls may incline in a leftward direction.

As described above, the inner peripheral cut-away portion of the thrust washer 30 according to the third embodiment includes the left inner peripheral cut-away portion 14L (first inner peripheral cut-away portion) formed at one of opposite end portions of the inner peripheral face 11 and the right inner peripheral cut-away portion 14R (second inner peripheral cut-away portion) formed at the other of the opposite end portions of the inner peripheral face 11, the right inner peripheral cut-away portion 14R being asymmetrical with the left inner peripheral cut-away portion 14L.

With this configuration, it is possible to improve material yield of the thrust washers 30 having the asymmetrical shapes.

Figure 9:
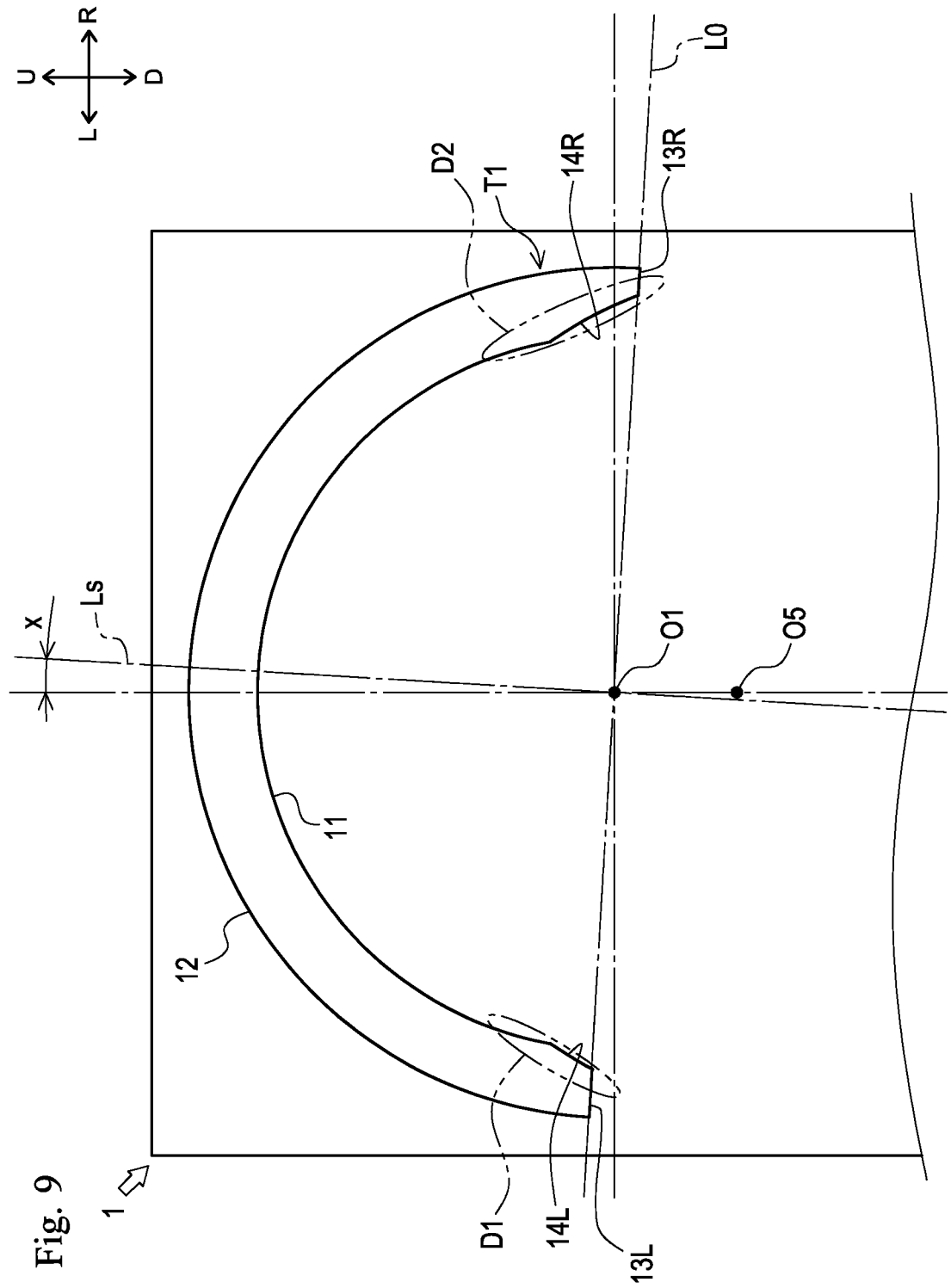
FIG. 9 is a front view showing a first area according to a fourth embodiment.
Figure 10:
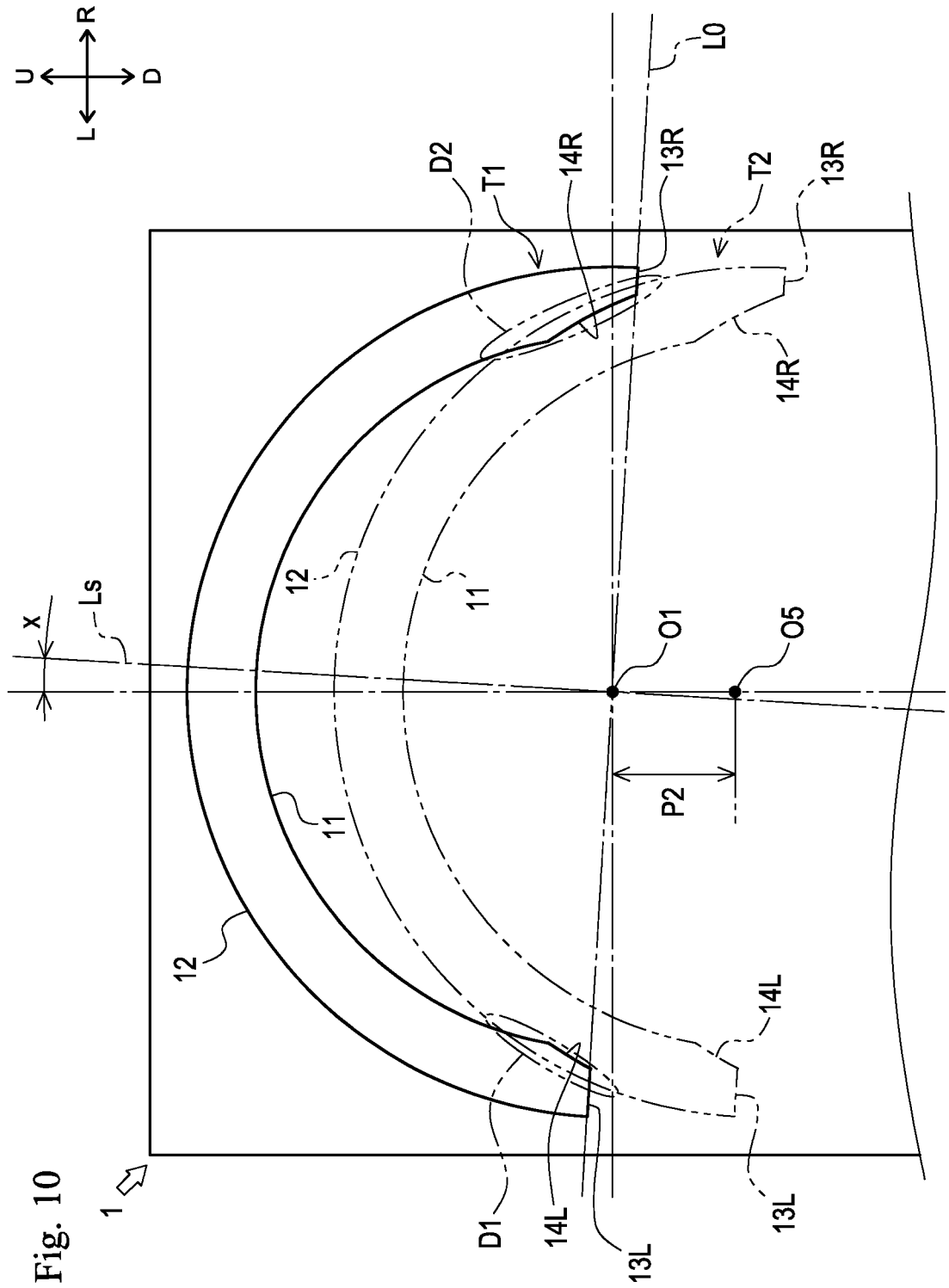
FIG. 10 is a front view showing a first area and a second area according to the fourth embodiment.
Figure 11:
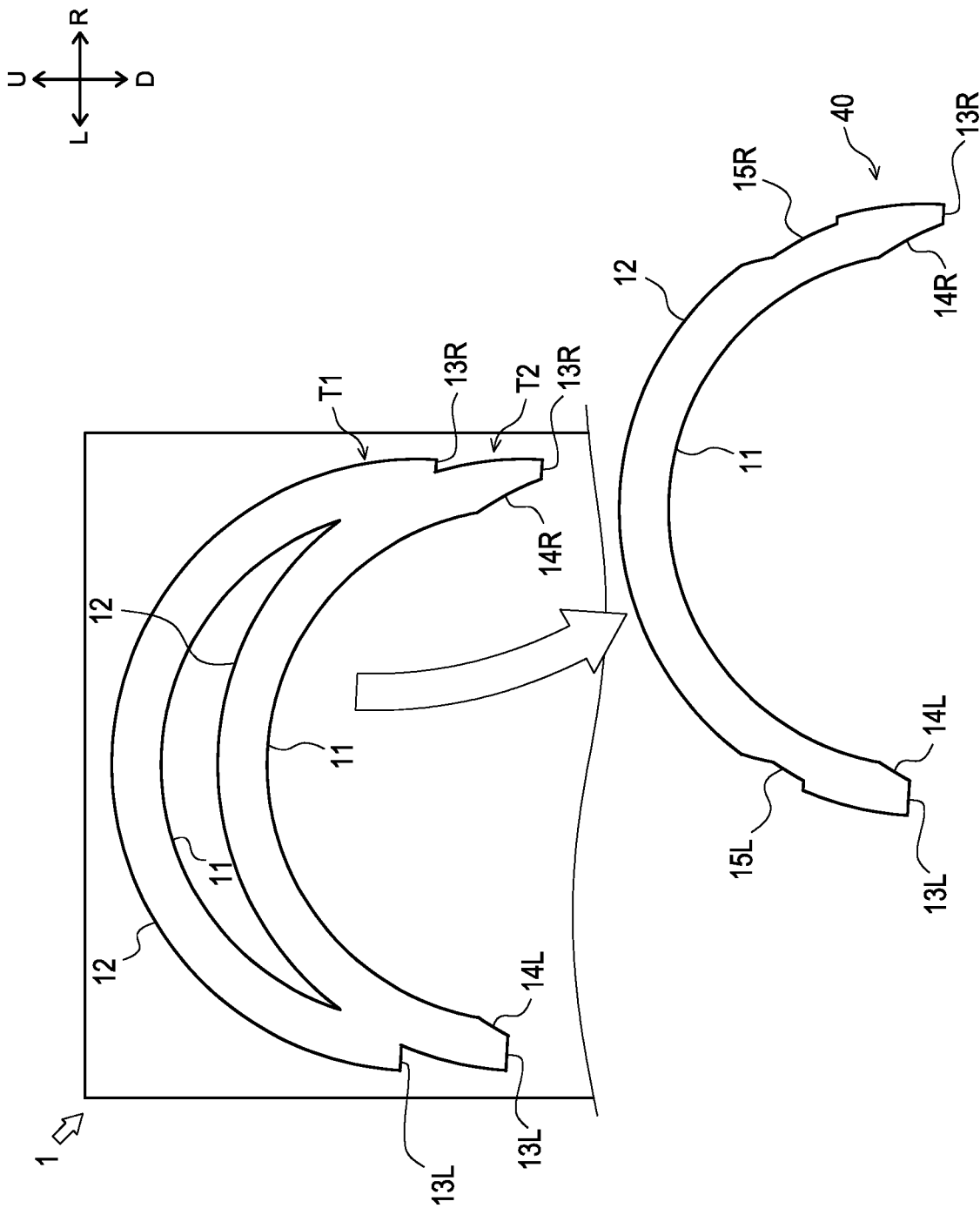
FIG. 11 is a front view of a manner in which a thrust washer according to the fourth embodiment is obtained by stamping.
Figure 12:
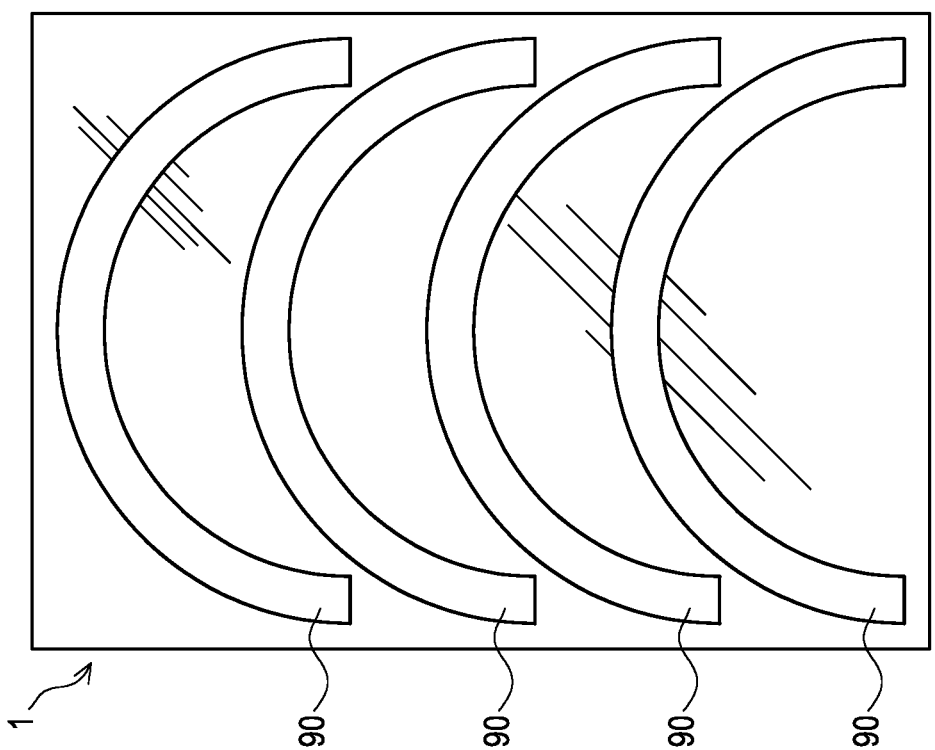
FIG. 12 is a schematic view showing a pitch of conventional thrust washers.

With reference to FIGS. 9 to 11, a method of manufacturing thrust washers 40 according to a fourth embodiment will be described below.

The method of manufacturing the thrust washers 40 according to the fourth embodiment is different from the method of manufacturing the thrust washers 30 according to the third embodiment mainly in shapes of areas (a first area T1, a second area T2) in which a material 1 is stamped. This will be specifically described below.

As shown in FIG. 9, the first area T1 according to the fourth embodiment does not have cut-away shapes corresponding to the left outer peripheral cut-away portion 15L and the right outer peripheral cut-away portion 15R (see FIG. 8 and the like). In other words, in the fourth embodiment, a die for obtaining the thrust washer 40 by stamping does not have cut-away shapes corresponding to the left outer peripheral cut-away portion 15L and the right outer peripheral cut-away portion 15R. By using such a die, the first area T1 of the material 1 is stamped in a first stamping step S2 (see FIG. 9).

The second area T2 is set at a position displaced downward by a predetermined pitch P2 in the longitudinal direction (vertical direction) of the material 1 from the first area T1 (see FIG. 10). At this time, the second area T2 is set so as to partially overlap with the first area T1. Specifically, the second area T2 is set such that portions corresponding to an outer peripheral face 12 of the second area T2 overlap with a first end portion D1 and a second end portion D2 of the first area T1. By stamping the second area T2, it is possible to obtain the thrust washer 40 having a left outer peripheral cut-away portion 15L and a right outer peripheral cut-away portion 15R formed on the outer peripheral face 12 (see FIG. 11).

As described above, in the method of manufacturing the thrust washers 40 according to the fourth embodiment, the second thrust washer 40 is obtained by stamping the second area T2 partially overlapping with the first area T1, from which the first thrust washer 40 is obtained by stamping, in the second stamping step S3.

With this configuration, it is possible to easily manufacture the thrust washers 40. In other words, the thrust washers 40 can be manufactured by using the die without the cut-away shapes corresponding to the left outer peripheral cut-away portion 15L and the right outer peripheral cut-away portion 15R and it is possible to use an existing die to manufacture the thrust washers 40. In this way, it is possible to reduce manufacturing cost.

The thrust washer 10, the thrust washer 20, the thrust washer 30, and the thrust washer 40 according to the above-described embodiments each are an example of a washer according to the present invention.

Although the embodiments of the present invention have been described above, the present invention is not limited to the above-described configurations and can be changed in various ways without departing from a scope of the invention described in the claims.

For example, the washer may be used not only for receiving the load in the thrust direction (as the thrust washer) but also for arbitrary purposes.

The washer may be formed not only in the semicircular shape (the arc shape having the central angle of 180°) but also in other arc shapes (e.g., an arc shape having a central angle of 90° and an arc shape having a central angle of 60°.

The shapes of the inner peripheral cut-away portions and the outer peripheral cut-away portions can be changed to arbitrary shapes such as straight shapes and arc shapes.

The inner peripheral cut-away portions do not necessarily have to be formed at the opposite end portions of the washer. In other words, a single inner peripheral cut-away portion may be formed at only one of end portions. Similarly, a single outer peripheral cut-away portion may be formed.

In obtaining the second washer by stamping in the second stamping step, it is possible to stamp a portion displaced in an arbitrary direction from the portion from which the first washer is obtained by stamping. For example, instead of stamping the portion displaced downward from (to a side of the end faces of) the first washer as described in each of the above-described embodiments, it is also possible to stamp a portion displaced upward from (to an opposite side from the end faces of) the first washer. When the portion displaced to the side of the end faces is stamped, the outer peripheral cut-away portions of the second washer face the end portions of the inner peripheral face of the first washer. On the other hand, when the portion displaced to the opposite side from the end faces is stamped, the end portions of the inner peripheral face of the second washer face the outer peripheral cut-away portions of the first washer.

Figure 13:
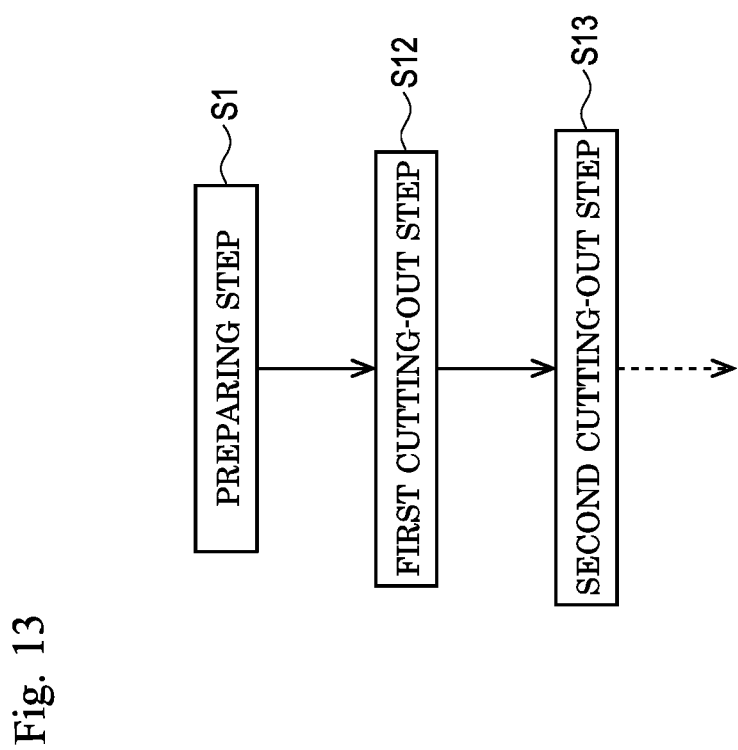
FIG. 13 is a flowchart showing a method of manufacturing thrust washers according to a fifth embodiment.

With reference to FIGS. 13 to 14(c), a method of manufacturing thrust washers 10 according to a fifth embodiment will be described below.

The method of manufacturing the thrust washer 10 according to the fifth embodiment is different from the method of manufacturing the thrust washers 10 according to the first embodiment mainly in that the method includes a first cutting-out step S12 and a second cutting-out step S13 in place of the first stamping step S2 and the second stamping step S3 (see FIG. 2). The first cutting-out step S12 and the second cutting-out step S13 will be described below.

As shown in FIG. 13, after a preparing step S1 is performed as in the first embodiment, the first cutting-out step S12 is performed. The first cutting-out step S12 is a step of cutting out a thrust washer 10 from a material 1 prepared in the preparing step S1. In the first cutting-out step S12, a first area T1 (see FIG. 3(a)) of the material 1 corresponding to a shape of the thrust washer 10 is cut out by using a laser. In this way, it is possible to obtain the thrust washer 10 from the material 1 (see FIG. 3(b)). At this time, because the laser is applied perpendicularly to a panel surface of the material 1, a worked end face (F1 in FIG. 14(c)) of the material 1 (thrust washer 10) is substantially perpendicular to the panel surface (F2 in FIG. 14(c)) of the material 1 (thrust washer 10).

After the first cutting-out step S12, the second cutting-out step S13 is performed.

The second cutting-out step S13 is a step of further cutting-out a thrust washer 10 having the same shape from the material 1 from which the thrust washer 10 has been cut out in the first cutting-out step S12. In the second cutting-out step S13, a second area T2 (see FIG. 3(b)) corresponding to the shape of the thrust washer 10 is cut out from the material 1 by using the laser.

A positional relationship between the first area T1 and the second area T2 is the same as that in the first embodiment (see FIG. 4). In other words, the second area T2 is set at a position displaced in a predetermined direction from the first area T1. By setting the second area T2 in this manner, it is possible to set the small pitch P1 while avoiding overlap (interference) between the thrust washer 10 in the first area T1 and the thrust washer 10 in the second area T2 as in the first embodiment.

After the second cutting-out step S13, a step (not shown) of further cutting out a thrust washer 10 from the material 1 as in the second cutting-out step S13 is repeated arbitrary times. In this way, it is possible to obtain a plurality of thrust washers 10 from the material 1 (see FIG. 5).

By using the laser in the first cutting-out step S12 and the second cutting-out step S13 according to the fifth embodiment, it is possible to simplify a subsequent step. This will be specifically described below.

When the material 1 is stamped by using the die as in the first stamping step S2 and the like according to the first embodiment, droop E1 and a burr E2 occur on each of worked end faces as shown in FIG. 14(b). However, if the material 1 is cut by using the laser as in the first cutting-out step S12 according to the fifth embodiment, droop and a burr are less likely to occur on each of worked end faces as shown in FIG. 14(c). Therefore, in the subsequent step, it is possible to simplify or eliminate working (grinding, chamfering, and the like) for removing the droop E1 and the burrs E2 of the thrust washer 10.

In the fifth embodiment, because the die is not used in the first cutting-out step S12 and the like, it is possible to reduce the cost of the die. Especially in the case of manufacturing a plurality of kinds of thrust washers (in different shapes), it is necessary to have a die for each shape, which results in a cost increase. In the fifth embodiment, however, it is possible to avoid such a problem.

As described above, the method of manufacturing the thrust washers 10 according to the fifth embodiment includes: the preparing step S1 of preparing the material 1 having a panel shape; the first cutting-out step S12 of cutting out the first thrust washer 10 having a substantially arc shape from the material 1; and the second cutting-out step S13 of cutting out the second thrust washer 10 from the portion of the material 1 in contact with the portion from which the first thrust washer 10 is cut out.

With this configuration, it is possible to improve the material yield. In other words, it is possible to set the small pitch between the two thrust washers by obtaining the second thrust washer 10 from the portion in contact with the first thrust washer 10. Moreover, it is possible to suppress occurrence of the droop E1 and the like. As a result, it is possible to simplify or eliminate the working (grinding, chamfering, and the like) in the subsequent step.

Although the thrust washers 10 in the same shapes as those in the first embodiment are manufactured in the case described in the fifth embodiment, the present invention is not limited to this and it is possible to manufacture thrust washers in arbitrary shapes (e.g., the thrust washers 20 according to the second embodiment).

Although the material 1 is cut by using the laser in the fifth embodiment, the present invention is not limited to this and it is possible to cut the material 1 by various other methods (e.g., milling and wire cut electric discharge machining).

INDUSTRIAL APPLICABILITY

The present invention can be applied to the washer formed in the arc shape.

REFERENCE SIGNS LIST

10: Thrust washer
11: Inner peripheral face
12: Outer peripheral face
13L: Left end face
13R: Right end face
14L: Left inner peripheral cut-away portion
14R: Right inner peripheral cut-away portion
15L: Left outer peripheral cut-away portion
15R: Right outer peripheral cut-away portion

The invention claimed is:

1. A method of manufacturing washers, the method comprising:
   a providing step of providing a material having a panel shape;
   a first cutting-out step of cutting out a first washer having an inner peripheral face formed in an arc shape and an outer peripheral face formed in an arc shape concentric with the inner peripheral face on a radially outer side of the inner peripheral face from the material; and
   a second cutting-out step of cutting out a second washer from a portion of the material in contact with a portion from which the first washer is cut out, the second washer having an inner peripheral face formed in an arc shape and an outer peripheral face formed in an arc shape concentric with the inner peripheral face on a radially outer side of the inner peripheral face;
   one end face of the first washer extends in a straight line along an imaginary straight line passing through an arc center of the inner peripheral face and the outer peripheral face of the first washer;
   another end face of the first washer extends in a straight line along the imaginary straight line passing through the arc center of the inner peripheral face and the outer peripheral face of the first washer;
   the imaginary straight line is inclined at an angle with respect to an imaginary line perpendicular to a line crossing the arc center of the first washer obtained in the first cutting-out step and an arc center of the inner peripheral face and the outer peripheral face of the second washer obtained in the second cutting-out step;
   wherein, in the second cutting-out step, a first inner peripheral cut-away portion is formed at one of opposite end portions of the inner peripheral face of the second washer and a second inner peripheral cut-away portion is formed at another of the opposite end portions of the inner peripheral face of the second washer;
   the second inner peripheral cut-away portion and the first inner peripheral cut-away portion are asymmetrical, and the first inner peripheral cut-away portion is larger than the second inner peripheral cut-away portion;
   the first inner peripheral cut-away portion of the second washer and the second inner peripheral cut-away portion of the second washer are formed along a same circumference;
   wherein, in the second cutting-out step, a first outer peripheral cut-away portion is formed at the one of the opposite end portions of the outer peripheral face of the second washer and a second outer peripheral cut-away portion is formed at the another of the opposite end portions of the outer peripheral face of the second washer;
   the first outer peripheral cut-away portion is larger than the second outer peripheral cut-away portion; and
   the arc center of the second washer is arranged between the arc center of the first washer and an arc center of a first inner peripheral cut-away portion and a second inner peripheral cut-away portion of the first washer.

2. The method according to claim 1,
   wherein the second washer is cut out such that the first outer peripheral cut-away portion formed on the outer peripheral face of the second washer is in contact with an end portion of a first area correspond to the inner peripheral face of the first washer in the second cutting-out step.

* * * * *